(12) United States Patent
Shilo et al.

(10) Patent No.: US 9,749,009 B2
(45) Date of Patent: *Aug. 29, 2017

(54) CABLE WITH FIELD-WRITEABLE MEMORY

(71) Applicant: MELLANOX TECHNOLOGIES LTD., Yokneam (IL)

(72) Inventors: Avital Shilo, Binyamina (IL); Amit Zvi Krig, Haifa (IL); Eyal Moshe Waldman, Tel Aviv (IL); Ronnen Lovinger, Tel Aviv (IL); Shai Rephaeli, Kiryat-Tivon (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 335 days.

This patent is subject to a terminal disclaimer.

(21) Appl. No.: 14/527,928

(22) Filed: Oct. 30, 2014

(65) Prior Publication Data

US 2015/0051870 A1 Feb. 19, 2015

Related U.S. Application Data

(63) Continuation of application No. 13/091,161, filed on Apr. 21, 2011, now Pat. No. 8,903,683.

(Continued)

(51) Int. Cl.
| | |
|---|---|
| *H04B 3/46* | (2015.01) |
| *G06F 11/30* | (2006.01) |
| *G06F 11/07* | (2006.01) |
| *H01R 13/66* | (2006.01) |
| *H01R 24/64* | (2011.01) |

(52) U.S. Cl.
CPC .......... *H04B 3/46* (2013.01); *G06F 11/0745* (2013.01); *G06F 11/30* (2013.01); *G06F 11/3041* (2013.01); *G06F 11/3055* (2013.01); *H01R 13/665* (2013.01); *H01R 24/64* (2013.01); *G06F 11/076* (2013.01); *G06F 11/0766* (2013.01)

(58) Field of Classification Search
CPC ........... H04B 3/46; H04B 10/00; G06F 11/30; G06F 11/3041; G06F 11/3055; G06F 11/0745; G06F 11/076; G06F 11/0766; G07C 3/00; H01R 13/665; H01R 24/64
See application file for complete search history.

(56) References Cited

U.S. PATENT DOCUMENTS

| | | | |
|---|---|---|---|
| 7,260,302 B2 | 8/2007 | Caveney | |
| 7,760,094 B1 | 7/2010 | Kozischek et al. | |

(Continued)

FOREIGN PATENT DOCUMENTS

| | | |
|---|---|---|
| CN | 1917098 A | 2/2007 |
| CN | 202404636 U | 8/2012 |
| JP | 2007140886 A | 6/2007 |

OTHER PUBLICATIONS

U.S. Appl. No. 14/662,258 Office Action dated Sep. 15, 2016.
CN Application # 2014100122899 Office Action dated Mar. 1, 2017.

*Primary Examiner* — Toan Le
(74) *Attorney, Agent, or Firm* — D. Kligler IP Services Ltd.

(57) ABSTRACT

A method includes monitoring a use of a cable assembly that includes a communication cable terminated by a termination module. Data indicative of the use is written to a writeable non-volatile memory in the termination module. The use of the cable assembly is acted upon by reading the data from the non-volatile memory.

37 Claims, 4 Drawing Sheets

Related U.S. Application Data

(60) Provisional application No. 61/327,737, filed on Apr. 26, 2010, provisional application No. 61/329,114, filed on Apr. 29, 2010.

(56) References Cited

U.S. PATENT DOCUMENTS

| | | | |
|---|---|---|---|
| 8,903,683 B2 * | 12/2014 | Shilo | G06F 11/0745 377/16 |
| 2004/0065470 A1 | 4/2004 | Goodison et al. | |
| 2007/0004241 A1 | 1/2007 | Meier et al. | |
| 2008/0031576 A1 * | 2/2008 | Hudgins | H04B 10/075 385/92 |
| 2008/0172722 A1 | 7/2008 | Fujita et al. | |
| 2008/0318465 A1 | 12/2008 | Johnsen et al. | |
| 2010/0176962 A1 | 7/2010 | Yossef | |
| 2011/0096781 A1 | 4/2011 | Aybay | |
| 2012/0187964 A1 | 7/2012 | Michaelis et al. | |
| 2013/0028157 A1 | 1/2013 | Ruster et al. | |
| 2014/0105029 A1 | 4/2014 | Jain et al. | |
| 2015/0009893 A1 | 1/2015 | Koyama et al. | |

* cited by examiner

FIG. 3
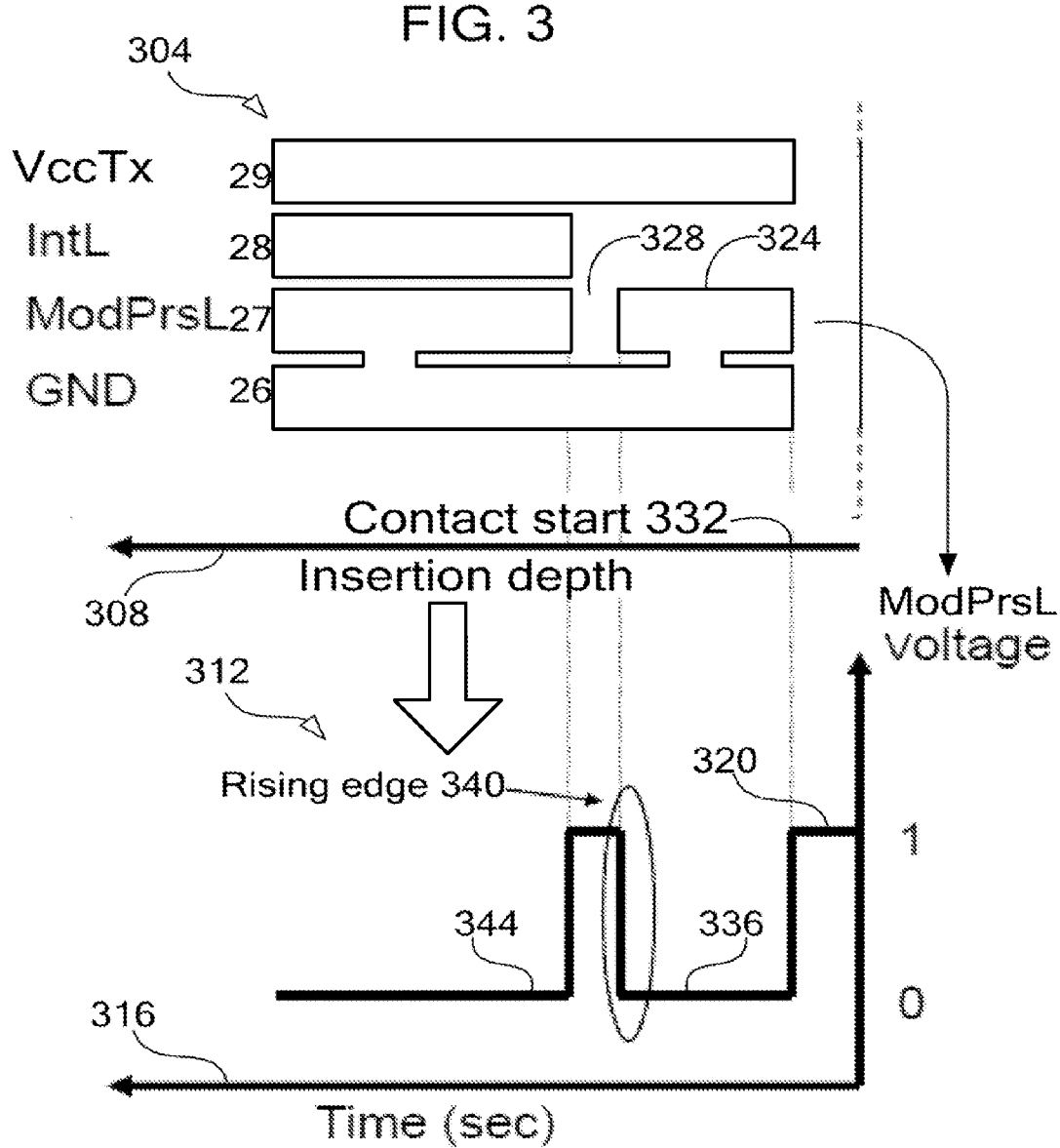
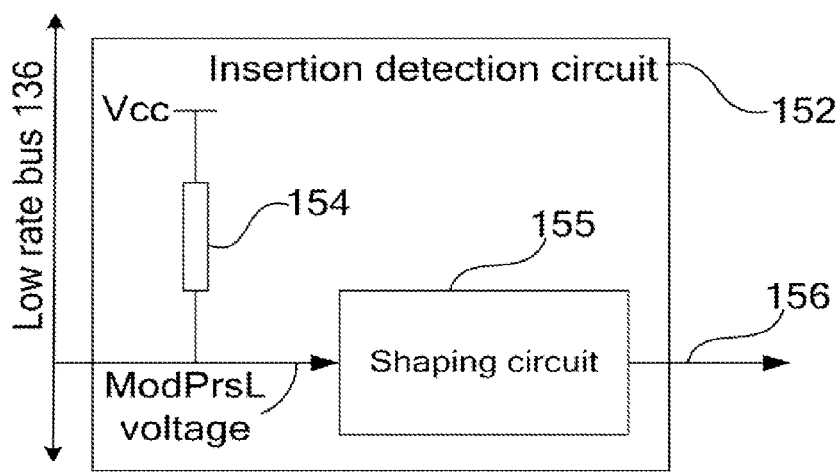

CABLE WITH FIELD-WRITEABLE MEMORY

CROSS-REFERENCE TO RELATED APPLICATIONS

This application is a continuation of U.S. patent application Ser. No. 13/091,161, which claims the benefit of U.S. Provisional Patent Application 61/327,737, filed Apr. 26, 2010, and U.S. Provisional Patent Application 61/329,114, filed Apr. 29, 2010, whose disclosures are incorporated herein by reference.

FIELD OF THE INVENTION

The present invention relates generally to cable assemblies, and particularly to methods and systems for logging data in cable assemblies.

BACKGROUND OF THE INVENTION

Small Form-factor Pluggable (SFP) modules are used in various telecommunication and data networking applications to interface between a printed circuit card in a network device and a network cable, wherein the cable may be electrical or fiber-optic. Typically, the SFP receptacle (denoted "connector" in SFP terminology) is mounted on the printed circuit card with appropriate electrical connections to the circuit traces on the card, and a termination plug (denoted "module") containing a transceiver at the end of the cable plugs into the receptacle.

The mechanical and electrical characteristics of various SFP modules have been defined by industry organizations. For example, the SFP+ specification defines hot-pluggable modules that may be used at data rates up to 10 Gb/s. Details of these modules have been set forth by the SFF Committee in the "SFF-8431 Specifications for Enhanced Small Form Factor Pluggable Module SFP+," Revision 4.1, Jul. 6, 2009, which is incorporated herein by reference.

Quad Small Form-factor Pluggable (QSFP) modules are used in similar applications to the SFP modules described above and support four parallel communication channels at 10 Gb/s. The mechanical and electrical characteristics of QSFP modules are described in the "INF-8438i Specification for Quad Small Form-factor Pluggable (QSFP) Transceiver Specifications," Revision 1.0, November, 2006, which is also incorporated herein by reference.

The above QSFP specifications include a management interface with a memory map of the QSFP transceiver for serial Identification (ID), digital monitoring and certain control functions (e.g., section 6.6 of the INF-8438i specification). In particular, bytes 224-255 of EEPROM page 00h may be used for Vendor Specific ID functions (e.g., section 6.6.2.29 of the INF-8438i specification).

SUMMARY OF THE INVENTION

An embodiment of the present invention that is described hereinbelow provides a method, which includes monitoring a use of a cable assembly that includes a communication cable terminated by a termination module. Data indicative of the use is written to a writeable non-volatile memory in the termination module. The use of the cable assembly is acted upon by reading the data from the non-volatile memory.

In some embodiment, monitoring the use includes counting insertions of the termination module into one or more interface ports, and writing the data includes updating a count of the insertions in the non-volatile memory. In an embodiment, acting upon the use includes outputting a notification when the count of the insertions exceeds a predefined limit. In a disclosed embodiment, counting the insertions includes forming a pad in the termination module so as to generate respective pulses in response to the insertions of the termination module, and updating the count in response to sensing the pulses.

In another embodiment, writing the data includes updating in the non-volatile memory an identifier of an interface port into which the termination module is plugged, and acting upon the use includes inferring whether a different termination module is plugged into a given interface port by reading the identifier from the non-volatile memory and comparing the read identifier with the identifier of the given interface port. In an embodiment, acting upon the use includes, in response to identifying that no different termination module is plugged, initiating an abridged negotiation process between the given interface port and a peer interface port.

In yet another embodiment, monitoring the use includes measuring one or more quality parameters relating to communication through the cable assembly, and writing the data includes logging the quality parameters in the non-volatile memory. In an embodiment, acting upon the use includes evaluating a quality of the cable assembly by comparing the logged quality parameters with respective predefined quality criteria. The quality parameters may include at least one parameter type selected from a group of types including a Bit Error Rate (BER), an error burst count, an error count and an eye pattern characteristic.

In some embodiments, writing the data includes accessing the non-volatile memory using electrical power that is provided by a power source fitted in the termination module. In an embodiment, acting upon the use includes illuminating an indicator light on the cable assembly based on the data read from the non-volatile memory. In a disclosed embodiment, the termination module is detachably connected to the communication cable, and the data written to the non-volatile memory is indicative of the use of the termination module.

In another embodiment, writing the data includes storing in the non-volatile memory a current configuration of a port into which the termination module is plugged, and, upon initializing the port, reading the data and configuring the port in accordance with the read data. In yet another embodiment, monitoring the use includes measuring operating time of the cable assembly, and writing the data includes updating a cumulative operating time of the cable assembly in the non-volatile memory. In still another embodiment, acting upon the use includes outputting a notification when the cumulative operating time exceeds a predefined limit.

There is additionally provided, in accordance with an embodiment of the present invention, a cable assembly including a communication cable, a termination module that terminates the communication cable, and a writeable non-volatile memory. The non-volatile memory is fitted in the termination module and has at least one storage address designated for storing data that is indicative of a use of the cable assembly.

There is also provided, in accordance with an embodiment of the present invention, apparatus including a connector and a host processor. The host processor is configured to communicate with a cable assembly when the cable assembly is connected to the connector, and to store data that is indicative of a use of the cable assembly in a non-volatile memory fitted in the cable assembly.

The present invention will be more fully understood from the following detailed description of the embodiments thereof, taken together with the drawings in which:

BRIEF DESCRIPTION OF THE DRAWINGS

FIG. 3 is a diagram of a module pad structure, in accordance with an embodiment of the present invention;

DETAILED DESCRIPTION OF EMBODIMENTS

Overview

Figure 1:
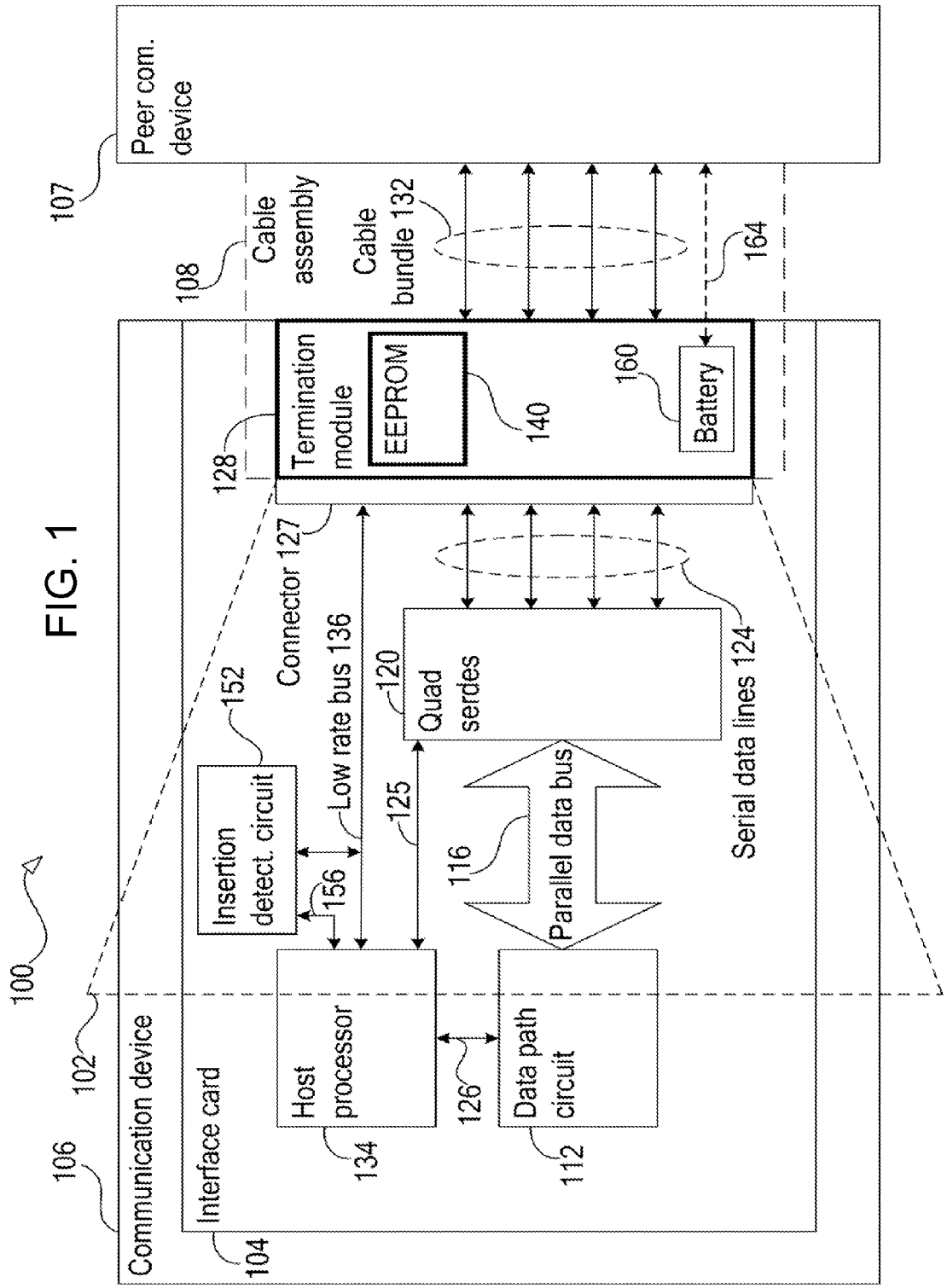
FIG. 1 is a block diagram that schematically illustrates a high data rate communication system, in accordance with an embodiment of the present invention.

Embodiments of the present invention provide improved methods and devices for logging data regarding use of cable assemblies, e.g., cables used in high rate data links. Such embodiments typically comprise an interface card of a communication device, into which one or more cable assemblies for high data rate transfer are plugged. A cable assembly typically comprises a communication cable that comprises one or more serial lines, either electrical (copper) or optical, which carry the high rate data or other signals between termination modules at both cable ends. Embodiments described herein relate to Quad Small Form-factor Pluggable (QSFP) modules, however, the disclosed techniques may relate to any suitable type of cable assembly and termination module.

In an embodiment, a termination module in a cable assembly comprises coupling circuits that adapt the signals on the card to the lines within the cable assembly. The module is terminated with a double sided Printed Circuit Board (PCB). When the module is plugged into a mating connector on the card, pads on the PCB are mechanically pressed against matching contacts on the connector, thus creating electrical connection between them. The module also comprises a writable non-volatile memory, in the present example an Electrically Erasable Programmable Read Only Memory (EEPROM), which is accessible by a host processor on the card through the connector via low data rate lines.

In an embodiment, the host processor writes data relating to use of a cable assembly, whose module is plugged into the card, into the module's EEPROM. Such data may comprise, for example, counting of module insertions into the card and communication quality statistics. More particularly, for writing new data in an EEPROM field, the host processor typically first reads the field content, modifies its value and then writes the updated value back to the field. Assuming each device into which the module is inserted is configured to update the module's EEPROM fields as described above, then data regarding the use of each module is accumulated in its EEPROM throughout its lifetime. When a given cable assembly is moved between different cards along its lifetime, the data relating to the cable assembly's use is accumulated and updated in the module's EEPROM.

When the host processor updates content of a field in a module EEPROM, it may compare the updated value with a predefined criterion that relates to the specific field. If the criterion is not met the host processor would alert a Monitoring and Control (M&C) system of this occurrence for applying consequent actions. For example, the host processor may use the data stored in the module EEPROM to detect a cable assembly that exceeded a maximum permitted number of extractions and insertions, and report this cable to the M&C system. Direct write (i.e., writing an EEPROM field without first reading its content) may be applied as well to some fields.

In some embodiments, the termination module of the cable assembly comprises one or more indicator lights (e.g., Light Emitting Diodes—LEDs). The indicator lights are used for visually indicating some of the use-related data that is stored in the non-volatile memory. The indicator lights can be controlled by the host processor and/or by internal control circuitry in the termination module.

The disclosed techniques enable reliable performance of electrical and optical cables, even when used under severe conditions, including frequent extraction and insertion events over lengthy time periods. The disclosed techniques also allow for fast data link establishment in case that the link conditions were not changed since the last link shutdown.

System Description

FIG. 1 is a block diagram that schematically illustrates a high data rate communication system 100, in accordance with an embodiment of the present invention. An interface card 104 of a communication device 106 comprises an interface port 102. Interface port 102 is part of a 10 Gbps bidirectional data link that connects device 106 and a peer communication device 107 through a cable assembly 108. Card 104 may comprise multiple interface ports such as port 100; however, only one port is illustrated in FIG. 1 for the sake of clarity. In alternative embodiments other data rates than 10 Gbps are supported by the disclosed techniques.

In the transmit direction of device 106, the 10 Gbps link emanates from a data path circuit 112 on card 104. Circuit 112 comprises, in particular, Media Access Control (MAC) layer, in case of an Ethernet interface. However, the disclosed techniques can be used in other interface types such as Synchronous Optical Network (SONET), Synchronous Digital Hierarchy (SDH), Infiniband, Fibre Channel or any other suitable interface and data rate. Data path circuit 112 is realized in typical embodiments by hardware, which may comprise Application-Specific Integrated Circuits (ASICs) and/or Field-Programmable Gate Arrays (FPGAs).

The link data passes through a parallel data bus 116 to a quad Serializer/Deserializer (SerDes) 120. The SerDes converts the parallel data to four serial streams and transfers them through four serial data lines 124 to a cable termination module 128. SerDes 120 typically encodes the serialized data thus providing DC-balance, a suitable framing and frequent transitions for easy clock extraction by a peer SerDes. A host processor 134 monitors and controls SerDes 120 and circuit 112 through lines 125 and 126 respectively, which may pertain to a common bus.

Termination module 128 terminates cable assembly 108 at interface card 104. The module is plugged into connector 127 on card 104, which terminates the interface port from the perspective of communication device 106. Module 128 couples serial lines 124 to a cable bundle 132, which is connected to a counterpart termination module (not shown in FIG. 1) in peer device 107. In case of electrical data transfer, each cable within bundle 132 typically consists of a twisted copper wire pair in each transfer direction. In case of optical data transfer, each cable typically consists of an optical fiber in each transfer direction while module 128 comprises electrical/optical transducers (not shown in FIG. 1). In alternative embodiments cable bundle 132 may comprise any suitable number of separate cables, which is typically, but not necessarily, equal to the number of data lines 124.

Module 128, together with its counterpart in peer device 107, and cable bundle 132, compose cable assembly 108. In other words, module 128 is part of cable assembly 108 and is permanently connected to the cable bundle or optical fiber of the cable assembly. When the cable assembly is extracted from card 104, module 128 disconnects from connector 127 of the card.

Figure 2:
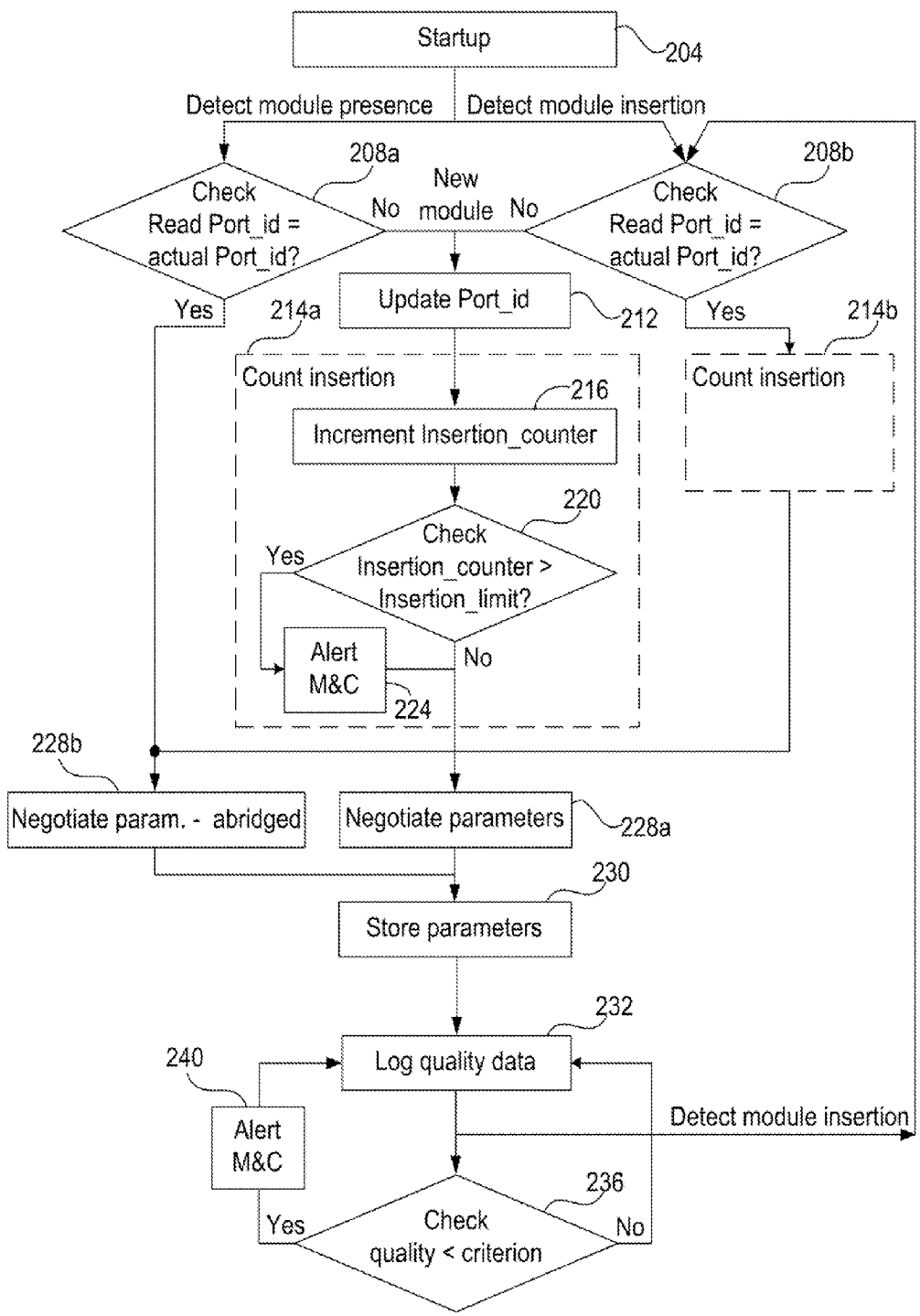
FIG. 2 is a flowchart that schematically illustrates a method for logging data regarding cable use, in accordance with an embodiment of the present invention.

Termination module 128 of cable assembly 108 comprises a non-volatile memory, in the present example an EEPROM 140. The EEPROM is part of the cable assembly Host processor 134 on card 104 can write data, typically serially, through a low rate bus 136, to EEPROM 140 within module 128, and read data from the EEPROM as well. In an embodiment, host processor 134 uses EEPROM 140 for logging data regarding use of cable assembly 108, as illustrated by FIG. 2 below. In alternative embodiments memory 140 may comprise any other type of non-volatile memory, e.g. Flash memory. Flash memory may be preferable in some applications, e.g., because it typically offers a relatively large memory size and endures a relatively high number of write operations.

The host processor also uses bus 136 for monitoring and control module 128. In particular, it uses a ModPrsL line within bus 136 for detecting presence of module 128 in connector 127, optionally by means of an insertion detection circuit 152 and an interrupt line 156 as described below.

In alternative embodiments, module 128 also contains a power source 160, typically a battery, for supporting the disclosed techniques when the module is not connected to a powered port. In particular, the battery can be used for counting module insertion events when device 106 is powered down during the insertion. The battery may be rechargeable, and typically charged by the interface card into which it is plugged. In yet alternative embodiments battery 160 can be charged also by a peer card of peer device 107 via an optional charging line 164. This alternative charging path may be useful when the peer device is powered up while module 128 is not plugged in, or while the module is plugged into a shutdown device.

The configuration of system 100 shown in FIG. 1 is an example configuration, which is chosen purely for the sake of conceptual clarity. In alternative embodiments, any other suitable interface port configuration can also be used. The above description has focused on the specific elements of system 100 that are essential for understanding certain features of the disclosed techniques. Conventional elements that are not needed for this understanding have been omitted from FIG. 1 for the sake of simplicity but will be apparent to persons of ordinary skill in the art.

Method Description

FIG. 2 is a flowchart, depicted as a state machine, which schematically illustrates a method for logging data regarding cable use, in accordance with an embodiment of the present invention. The method begins with a host processor startup step 204, wherein host processor 134 initializes and monitors status of the various components on interface card 104. In particular, the processor checks for presence of module 128 in connector 127. The present description relates to interface port 100, but in a general case of a multiport interface card 104, it equally relates to all the ports on the card.

If the processor detects a "module presence" condition, typically according to a low ModPrsL signal level that the module applies on a corresponding connector contact, the method proceeds to a checking step 208a. If the processor does not detect a module it waits until a module is plugged into connector 127, and then, upon detecting "module insertion," the method proceeds to a checking step 208b. The processor typically detects the insertion according to signal ModPrsL falling to a low level. In alternative embodiments the processor is interrupted upon a module insertion event by insertion detection circuit 152, as illustrated in FIG. 3 below.

At checking steps 208a/b the processor reads a 6 bit port identifier (Port_id) field in EEPROM 140 that is coupled to module 128. This field typically contains an identity value of the last port into which the module (and thus cable assembly 108) was plugged. In an embodiment, host processor 134 determines the Port_id of an interface port by applying a hash function on some parameters of the port, e.g. its Globally Unique Identifier (GUID)/MAC address and the port number on interface card 104. While at steps 208a/b, the processor compares the Port_ID read from EEPROM 140 with the actual Port_ID. Detecting different Port_ID values means that the module was replaced by a new module when the host processor was off, hence the method proceeds to an update step 212, in which the processor writes the actual Port_id to the Port_id field in the EEPROM.

The method then proceeds to an insertion counting step 214a, in which the number of insertion events that module 128 has experienced along its lifetime is accumulated. Step 214a begins with an incrementing sub-step 216, in which host processor 134 increments a counter of insertions (Insertion_counter) field in EEPROM 140, of typically 12 bit size. At a checking sub-step 220, the processor compares Insertion_counter value with a limit of insertions (Insertion_limit) field in the EEPROM. The Insertion_limit value is written to the EEPROM either by the cable assembly manufacturer, or by the user of the cable according to the cable specification. In the event that the counter value exceeds the limit value, the processor would alert the M&C system (not shown in FIG. 1), at an alerting sub-step 224, of that event.

In an embodiment, EEPROM 140 further comprises a state field of a finite state machine that pertains to a predefined process that host processor 134 maintains concerning module 128. In this example implementation, host processor 134 executes a state machine, and continually stores the current state of the state machine in EEPROM 140. When the cable assembly is moved to another port, or following a reset to host processor 134, the host processor may read the state from EEPROM 140 and resume the state machine execution.

At a negotiating step 228a, the host processor manages a negotiation process with the processor of a peer host (connected to the distant end of cable assembly 108) for setting common communication parameters between quad SerDes 120 and the peer quad SerDes, such as signal speed, encoding type, protocol type, Forward error Correction (FEC) scheme, duplex type, clock master and any other suitable parameter.

If the check result at steps 208a/b is "Yes," i.e. the read Port_id is identical to the actual Port_id, the method proceeds to an abridged negotiating step 228b. The flowchart path from step 208b to 228b passes through a step 214b, which is similar to step 214a, since step 208b occurs after host processor 134 has detected module insertion to connector 127. A quick SerDes parameter setting at step 228b is usually possible when the ports at both ends of cable assembly 108 are left the same through a system power shutdown and restart (i.e., when the cable assembly is not moved to a different port during shutdown). In this case the standard negotiation process of step 228a is redundant, and can be skipped after first successful inter-SerDes link establishment, thus saving a lengthy restart delay.

In order to allow abridged negotiation in a subsequent restart, the processor typically stores in EEPROM 140, at a storing step 230, the SerDes signal parameters that were agreed upon in the last negotiation event. The processor may store in the EEPROM at step 230 additional parameters that are necessary for abridged negotiation such as SerDes parameters pointer in the processor firmware, device ID and firmware revision—required for SerDes parameters pointer field parsing, as well as "eye pattern" characterization that was measured after the last negotiation step, including the temperature at which the eye pattern was characterized. In an embodiment, for carrying out the abridged negotiation at step 228b, the processor first verifies according to the Port_id field that module 128 has not been changed. The processor then establishes a low data rate link with the peer processor and verifies that the peer is ready for abridged negotiation as well. Both processors then read the SerDes parameters that were previously stored in EEPROMs 140 at both cable ends and attempt to set a new data link accordingly. The last eye result and temperature that are stored in the EEPROM at step 130 can help the processor to troubleshoot poor link performance that may result from improper attachment of module 128 to connector 127, by making a new eye measurement and comparing it to the last measured eye. Another way to deal with improper module attachment is to check that the insertion counter was not incremented.

The method steps and transitions that follow pertain to steady state link operation. At a logging step 232, host processor 134 continually logs measured data that relates to communication quality parameters in corresponding fields within EEPROM 140. Example parameters of communication quality data are Bit Error Rate (BER), error bursts, error count during successive time periods, eye pattern characterization, or any other suitable parameters.

In an example embodiment the processor uses the following fields within EEPROM 140 for logging quality related data:
1. Hour meter (16 bit): Increased hourly by the processor. Sticks at 0xFFFF.
2. Last hour error counter (32 bit): Every hour the processor checks how many errors were added in the last hour and stores the result in this field.
3. Quality counter (8 bit): Every hour the processor checks the link quality (for example, number of bit or symbol errors). If link quality is good, the processor decreases this counter (down to 0). If the link quality is bad, the host increases this counter (up to 0xff).

In an alternative embodiment the processor may log in the EEPROM data that relates to link reception quality at the peer port, as reported by the peer host processor in a suitable protocol. When the host processor updates content of a field, it typically compares the updated content with a predefined criterion that relates to the specific field. This is illustrated at a checking step 236. If the criterion is not met, i.e. link quality<criterion, the method proceeds to an alerting step 240, in which host processor 134 alerts the M&C system of this event. The M&C system would then apply consequent actions, typically notifying the user of device 106. In alternative embodiments the M&C system queries the above fields through host processor 134 instead of being alerted by the processor in case of low link quality.

If the criterion is met at step 236 the method returns to step 232. While within the loop of steps 232 and 236, when host processor 134 detects module insertion (which obviously follows an extraction event), as described above, the method returns to step 208b and proceeds therefrom as described above.

The above mentioned fields can be preferably allocated within EEPROM 140, according to the above referenced QSFP+ specification, in the upper half of page number 02, which is allocated for a user of cable assembly 108. Bytes 224-255 of page number 00, which are vendor specific, can be also used for the above fields when module 128 and device 106 are of the same vendor. Part of the above mentioned fields, such as the Insertion_counter, Insertion_limit and the fields that store logged quality data, must reside in EEPROM 140. Other fields may, optionally, reside in a non-volatile memory (not shown in FIG. 1) within device 106. In embodiments which apply this option the Port id field is substituted by a Module_id field, which comprises a hash of EEPROM 140 fields that uniquely define module 128.

The method flow shown in FIG. 2 is an example flow, which was chosen purely for the sake of conceptual clarity. In alternative embodiments, any other suitable flow can also be used for illustrating the disclosed method. Method steps that are not mandatory for understanding the disclosed techniques were omitted from the figure for the sake of clarity.

Insertion Detection

FIG. 3 is a diagram of a structure of module 128 PCB pads, in accordance with an embodiment of the present invention. A partial group of the module PCB pads is denoted 304. Group 304 in the present example contains only four pads, which are numbered 26 to 29 in the above referenced QSFP+ specification, for the sake of clarity. In particular, pad 27, denoted ModPrsL, indicates "module presence" condition to host processor 134 when its voltage level equal to GND (ground) level, i.e. 0 volt or logically "0".

Pads 304 are depicted in FIG. 3 along an insertion depth axis 308, which corresponds to the depth at which module 128 is inserted into connector 127. The middle part of FIG. 3 illustrates a waveform 312 of the voltage on pad ModPrsL (pad 27) as sensed by insertion detection circuit 152 depicted at the lower part of the figure. Circuit 152 accepts ModPrsL level through bus 136. Waveform 312 is depicted along a time axis 316 (assuming a certain typical insertion speed). When module 128 is within the process of being plugged into connector 127, and its pads are inserted into the connector at a given depth on axis 308, waveform 312 at the respective time point on axis 316 signifies the ModPrsL voltage at that time.

When card 104 is powered up and module 128 is not plugged into it, the ModPrsL voltage is pulled up to VCC (power supply voltage) by a pull-up resistor 154 within circuit 152. This logical "1" of ModPrsL level is denoted 320 in waveform 312 and signifies a "Module not present"

state. ModPrsL pad is shorter than GND pad according to the QSFP+ specification. In an embodiment, pad 27 is extended by an added pad extension 324, which is shortcut to GND 26, as illustrated in the figure, but is electrically separated from pad 27 due to a notch 328. When module 128 is inserted into connector 127 and the insertion depth reaches a contact start point 332, pad 324 shortcuts resistor 154 to GND, which is illustrated by a fall of waveform 312 to a "0" level 336.

When the insertion depth reaches notch 328, the ModPrsL voltage is pulled up again to Vcc, i.e. logical level "1". This transition is illustrated by a rising edge 340. When the insertion depth reaches the end of notch 328, the ModPrsL voltage is pulled down again to GND, i.e. logical level "0", denoted 344 in waveform 312. A shaping circuit 155 within circuit 152 removes bouncing effect that normally occurs during module insertion, and generates suitable pulse following rising edge 340 for interrupting host processor 134 through line 156.

Indicator Lights on Termination Module

In some embodiments, termination module 128 comprises one or more indicator lights that are used for visually signaling some of the use-related information that is stored in the non-volatile memory of the termination module.

Figure 4:
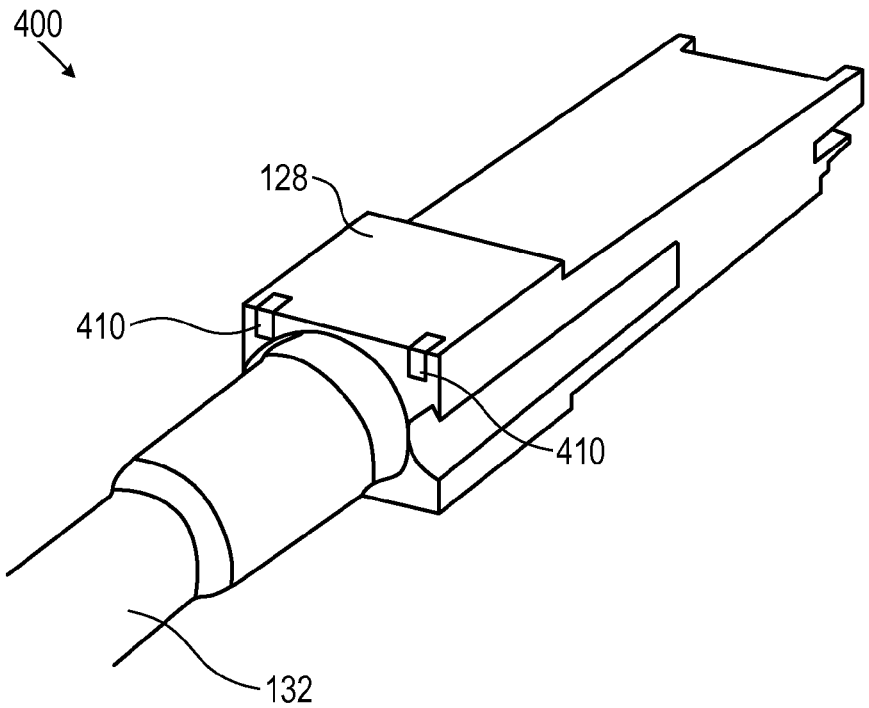
FIG. 4 is a schematic, pictorial illustration of a termination module in a cable assembly, in accordance with an embodiment of the present invention.

FIG. 4 is a schematic, pictorial illustration of a cable assembly 400, in accordance with an embodiment of the present invention. Cable assembly 400 can be used to implement cable assembly 108 of FIG. 1 above. In this embodiment, termination module 128 comprises two Light Emitting Diodes (LEDs) 410 that are fitted on the termination module and are visible to users when the termination module is plugged into an interface port. In alternative embodiments, the termination module may comprise any suitable number of indicator lights of any suitable type.

LEDs 410 can be used for visually indicating any of the use-related information stored in EEPROM 140. For example, a LED may be illuminated when the number of insertions and extractions of the cable assembly approaches the maximum permitted number. Any suitable visualization scheme can be used, such as using multiple-color LEDs or various blinking patterns. In one example embodiment, a LED is illuminated in green when the number of insertions/extractions is below the maximum permitted number, in orange when the number of insertions/extractions approaches the maximum permitted number, and in red when the number of insertions/extractions exceeds the maximum permitted number.

As another example, LEDs 410 can be used to visualize the quality of communication via the cable assembly, such as BER or eye pattern characteristics. Further alternatively, LEDs 410 may be used for visualizing any other information that is stored in EEPROM 140.

Figure 5:
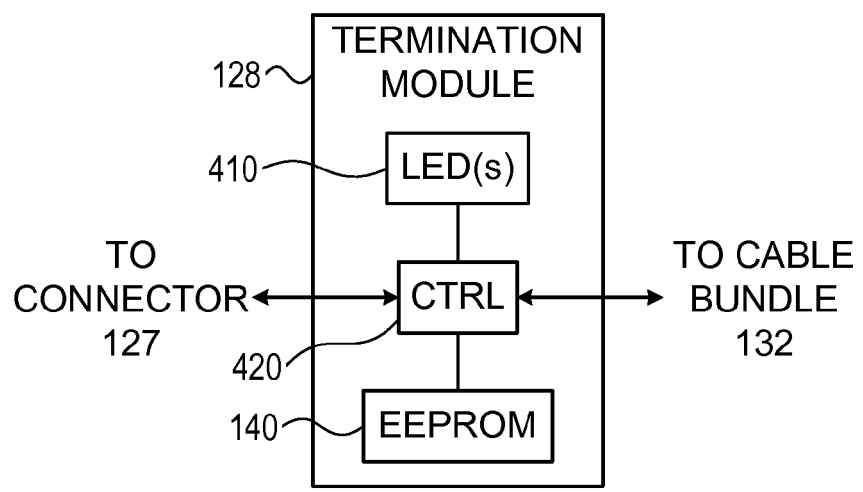
FIG. 5 is a block diagram that schematically illustrates a termination module in a cable assembly, in accordance with an embodiment of the present invention.

FIG. 5 is a block diagram that schematically illustrates termination module 128 of cable assembly 108, in accordance with an embodiment of the present invention. In this embodiment, termination module 128 comprises control circuitry 420 that controls LEDs 410. Control circuitry 420 may comprise hardware or firmware logic, and/or a microcontroller running suitable software. Control circuitry 420 reads information related to the use of the cable assembly from EEPROM 140, and controls (e.g., activates or deactivates) LEDs 410 based on this information. In an embodiment, control circuitry 420 checks whether the use-related information read from the EEPROM meets a predefined condition (e.g., whether the number of insertions/extractions exceeds a predefined maximum number). The control circuitry illuminates a LED if the condition is met.

In alternative embodiments, control circuitry 420 is omitted, and LEDs 410 are operated directly by host processor 134 (FIG. 1). In these embodiments, the host processor reads information related to the use of the cable assembly from EEPROM 140, and controls LEDs 410 based on this information. Further alternatively, the LEDs can be controlled jointly by host processor 134 and control circuitry 420. Additional aspects of operating indicator lights in the termination module can be found in U.S. Provisional Patent Application 61/329,114, cited above.

Although the embodiments described herein mainly address high data rate cables, the methods and systems exemplified by these embodiments can also be used in other applications that involve any suitable type of plug-in modules.

The embodiments described herein refer to specific types of data, relating to the use of a cable assembly, which are stored in EEPROM 140 of that cable assembly by host processors 134 of various cards 104 and ports 100. In alternative embodiments, any other suitable type of data relating to the usage of the cable assembly can be stored and utilized. Using these techniques, the usage of the cable assembly can be tracked and recorded within the cable assembly itself along its lifetime. The disclosed techniques record data that is indicative of the usage of the cable assembly along its lifetime, as opposed to cable parameters such as part number or cable identifier.

Additional Embodiments and Variations

In some embodiments, termination modules 128 are detachable from cable 132. Cable assembly 108 in these embodiments comprises two termination modules that are detachably connected to the two ends of a passive optical cable. In these embodiments, EEPROM 140 of a given termination module is used for storing data that is indicative of the use of that termination module, and typically not of the entire cable assembly. In the present context, the term "data indicative of the use of the cable assembly" refers also to data that is indicative of the use of any desired element of the cable assembly, e.g., the termination module.

In some embodiments, the data stored in EEPROM 140 defines the current transmit and/or receive configuration of port 102, e.g., the configuration of SerDes 120. When host processor 134 initializes the port following reset or other power interruption, and provided that the same cable assembly is connected to the port before and after the interruption, the host processor recovers the data from EEPROM 140 and sets the port transmit and/or receive configuration according to the read data.

As yet another example, the data stored in EEPROM 140 may indicate the cumulative operating time of cable assembly 108, e.g., the number of hours the cable assembly was active. This information is useful, for example, in some optical cable assemblies in which the reliability of optical transceivers deteriorates as a function of active use time. In some embodiments, host processor 134 increments the cumulative operating time stored in EEPROM 140 at certain time intervals, e.g., every hour. The host processor may read the cumulative operating time from the EEPROM and take appropriate action.

In one embodiment, the host processor issues an alert when the cumulative operating time of the cable assembly exceeds a predefined maximum duration (which may be stored in the EEPROM or in any other suitable location).

Additionally or alternatively, host processor 134 or control circuitry 420 may activate LED 410 for signaling that the cumulative operating time of the cable assembly exceeds the maximum duration.

Host processor 134 and/or control circuitry 420 may comprise a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. In some embodiments host processor 134 also comprises attached or embedded hardware modules for accelerating its operation. These modules may comprise Field-Programmable Gate Arrays (FPGAs) and/or Application-Specific Integrated Circuits (ASICs).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   providing a cable assembly that includes a communication cable terminated by a termination module and a writeable non-volatile memory embedded in the termination module;
   monitoring a use of the cable assembly, by a processor external to the cable assembly;
   repeatedly writing data, from the monitoring, indicative of a current state of the use of the cable assembly, to the writeable non-volatile memory in the termination module, by the processor external to the cable assembly; and
   controlling the use of the cable assembly based on data read from the non-volatile memory, by the processor external to the cable assembly.

2. The method according to claim 1, wherein monitoring the use comprises counting insertions of the termination module into one or more interface ports, and wherein writing the data comprises updating a count of the insertions in the non-volatile memory.

3. The method according to claim 2, wherein controlling the use comprises outputting a notification when the count of the insertions exceeds a predefined limit.

4. The method according to claim 2, wherein counting the insertions comprises forming a pad in the termination module so as to generate respective pulses in response to the insertions of the termination module, and updating the count in response to sensing the pulses.

5. The method according to claim 1, wherein writing the data comprises updating in the non-volatile memory an identifier of an interface port into which the termination module is plugged, and wherein controlling the use comprises inferring whether a different termination module is plugged into a given interface port by reading the identifier from the non-volatile memory and comparing the read identifier with the identifier of the given interface port.

6. The method according to claim 5, wherein controlling the use comprises, in response to identifying that no different termination module is plugged, initiating an abridged negotiation process between the given interface port and a peer interface port.

7. The method according to claim 1, wherein monitoring the use comprises measuring one or more quality parameters relating to communication through the cable assembly, and wherein writing the data comprises logging the quality parameters in the non-volatile memory.

8. The method according to claim 7, wherein controlling the use comprises evaluating a quality of the cable assembly by comparing the logged quality parameters with respective predefined quality criteria.

9. The method according to claim 7, wherein the quality parameters comprise at least one parameter type selected from a group of types comprising a Bit Error Rate (BER), an error burst count, an error count and an eye pattern characteristic.

10. The method according to claim 1, wherein writing the data comprises accessing the non-volatile memory using electrical power that is provided by a power source fitted in the termination module.

11. The method according to claim 1, wherein controlling the use comprises illuminating an indicator light on the cable assembly based on the data on the current state of the use of the cable assembly read from the non-volatile memory.

12. The method according to claim 1, wherein the termination module is detachably connected to the communication cable, and wherein the data written to the non-volatile memory is indicative of the use of the termination module.

13. The method according to claim 1, wherein writing the data comprises storing in the non-volatile memory a current configuration of a port into which the termination module is plugged, and, upon initializing the port, reading the data and configuring the port in accordance with the read data.

14. The method according to claim 1, wherein monitoring the use comprises measuring operating time of the cable assembly, and wherein writing the data comprises updating a cumulative operating time of the cable assembly in the non-volatile memory.

15. The method according to claim 14, wherein controlling the use comprises outputting a notification when the cumulative operating time exceeds a predefined limit.

16. The method according to claim 1, wherein monitoring the use of the cable assembly is performed by the processor external to the cable assembly.

17. The method according to claim 1, wherein the writeable non-volatile memory embedded in the termination module stores parameters of the communication cable.

18. The method according to claim 1, wherein writing the data indicative of the use is performed in a given interval at least once an hour.

19. The method according to claim 1, wherein the communication cable comprises a copper cable.

20. A cable assembly, comprising:
    a communication cable;
    a termination module that terminates the communication cable; and
    a writeable non-volatile memory, which is fitted in the termination module and has at least one storage address designated for storing data that is indicative of a use of the cable assembly,
    wherein the termination module mates with a connector in a manner allowing data communication between the connector and the communication cable and allowing an external processor to write data that is indicative of a use of the cable assembly into the writeable non-volatile memory.

21. The cable assembly according to claim 20, and comprising a power source embedded in the termination module, which is configured to provide electrical power for writing the data into the non-volatile memory.

22. The cable assembly according to claim 20, wherein the termination module is detachably connected to the communication cable, and wherein the data stored in the at least one storage address is indicative of the use of the termination module.

23. A cable assembly, comprising:
a communication cable;
a termination module that terminates the communication cable;
a writeable non-volatile memory, which is fitted in the termination module and has at least one storage address designated for storing data that is indicative of a use of the cable assembly, and
at least one LED on the termination module, which is arranged to be controlled responsive to data indicative of a use of the cable assembly stored in the memory,
wherein the termination module mates with a connector in a manner allowing an external processor to write data that is indicative of a use of the cable assembly into the writeable non-volatile memory.

24. The cable assembly according to claim 23, wherein the at least one LED on the termination module comprises multiple-color LEDs.

25. The cable assembly according to claim 23, wherein the at least one LED is visible to human users when the termination module is plugged into an interface port.

26. The cable assembly according to claim 23, comprising a control circuit embedded in the termination module, configured to control the at least one LED on the termination module responsive to data indicative of a use of the cable assembly stored in the memory.

27. The cable assembly according to claim 26, wherein the control circuit is configured to control the LED to operate various blinking patterns responsive to data indicative of a use of the cable assembly stored in the memory.

28. Apparatus, comprising:
a connector configured to connect to a termination module of a cable assembly; and
a host processor, which is configured to monitor a use of a cable connected to the connector, and to repeatedly store data that is indicative of a current state of the use of the cable assembly into a non-volatile memory in the cable assembly.

29. The apparatus according to claim 28, wherein the host processor is configured to count insertions of the termination module into one or more interface ports, and to update a count of the insertions in the non-volatile memory.

30. The apparatus according to claim 28, wherein the host processor is configured to update in the non-volatile memory an identifier of an interface port into which the termination module is plugged.

31. The apparatus according to claim 28, wherein the host processor is configured to measure one or more quality parameters relating to communication through the cable assembly, and to write the quality parameters in the non-volatile memory.

32. The apparatus according to claim 28, wherein the host processor is configured to update a cumulative operating time of the cable assembly in the non-volatile memory.

33. The apparatus according to claim 28, wherein the host processor is configured to write to the non-volatile memory at least once an hour.

34. A cable assembly, comprising:
a communication cable;
a termination module that terminates the communication cable;
a writeable non-volatile memory, which is fitted in the termination module and has at least one storage address designated for storing data that is indicative of a use of the cable assembly; and
a power source fitted in the termination module, which is configured to power circuitry which determines data to be stored in the memory, when the termination module is not connected to a powered port.

35. The assembly according to claim 34, wherein the power source fitted in the termination module is arranged to power circuitry located outside the cable assembly, which determines data to be stored in the memory.

36. The assembly according to claim 34, wherein the power source is rechargeable through an interface into which the termination module is plugged.

37. The assembly according to claim 34, wherein the power source is rechargeable through a charging line running along the communication cable.

* * * * *